United States Patent

[11] 3,624,786

| [72] | Inventor | Ezra Cordell Lundahl<br>Providence, Utah |
|---|---|---|
| [21] | Appl. No. | 876,943 |
| [22] | Filed | Nov. 14, 1969 |
| [45] | Patented | Nov. 30, 1917 |
| [73] | Assignee | Hesston Corporation<br>Hesston, Kans. |

[54] WHEEL SUSPENSION
4 Claims, 8 Drawing Figs.

[52] U.S. Cl. .................................................. 214/505,
280/80 B, 298/20 R, 298/22 F
[51] Int. Cl. .................................................... B60p 1/28
[50] Field of Search ........................................ 214/505,
506; 280/80 B, 80; 298/20 R, 20 A, 22 F

[56] References Cited
UNITED STATES PATENTS

| 2,717,707 | 9/1955 | Martin .......................... | 214/505 |
| 2,753,064 | 7/1956 | Lesser .......................... | 280/80 B |
| 3,003,780 | 10/1961 | Lundahl ....................... | 214/505 X |

*Primary Examiner*—Albert J. Makay
*Attorney*—Schmidt, Johnson, Hovey & Williams ABSTRACT: A tilt bed vehicle is supported by both a chassis and a separate wheeled undercarriage, all interconnected such that the undercarriage is moved forwardly of the bed as the latter is tilted. The undercarriage includes a pair of wheeled trucks which swing about horizontal and vertical axes, each trunk including a front, a rear, and an intermediate wheel and axle assembly with the intermediate assembly pivotally mounted for swinging movement about an axis extending fore and aft of the vehicle.

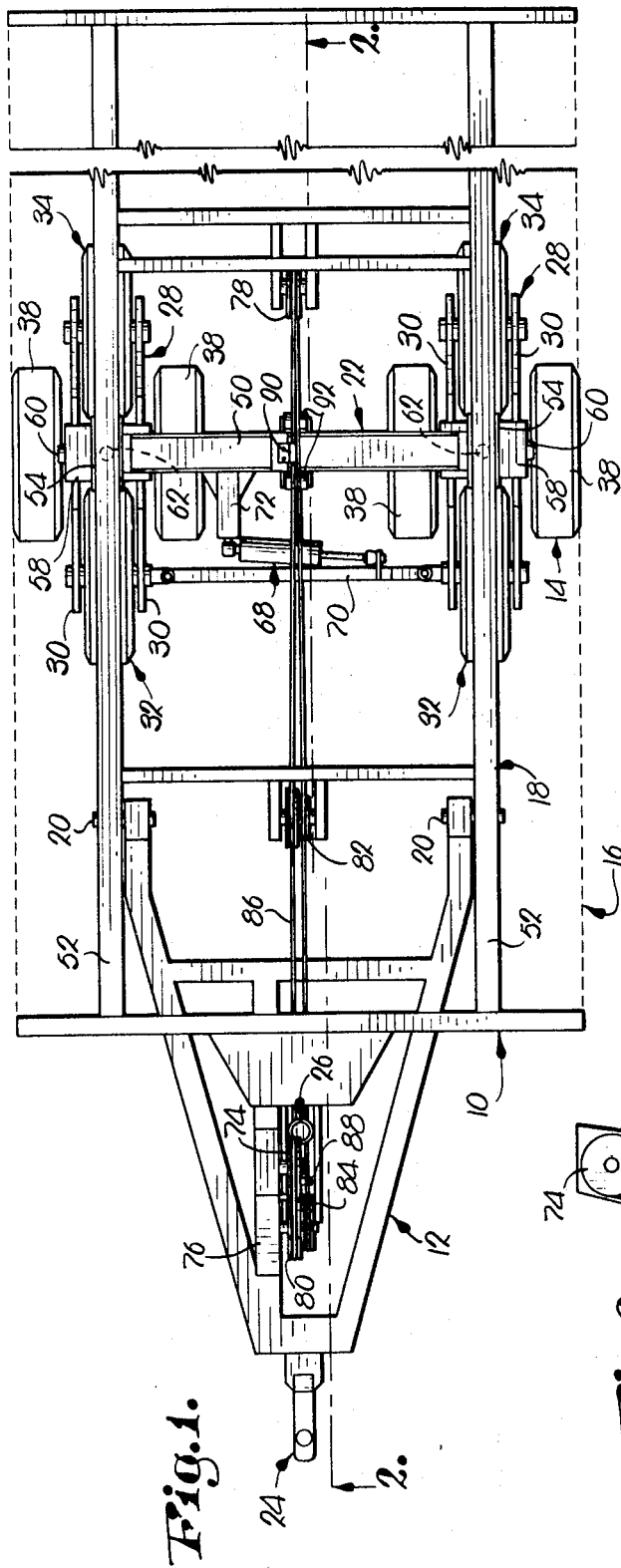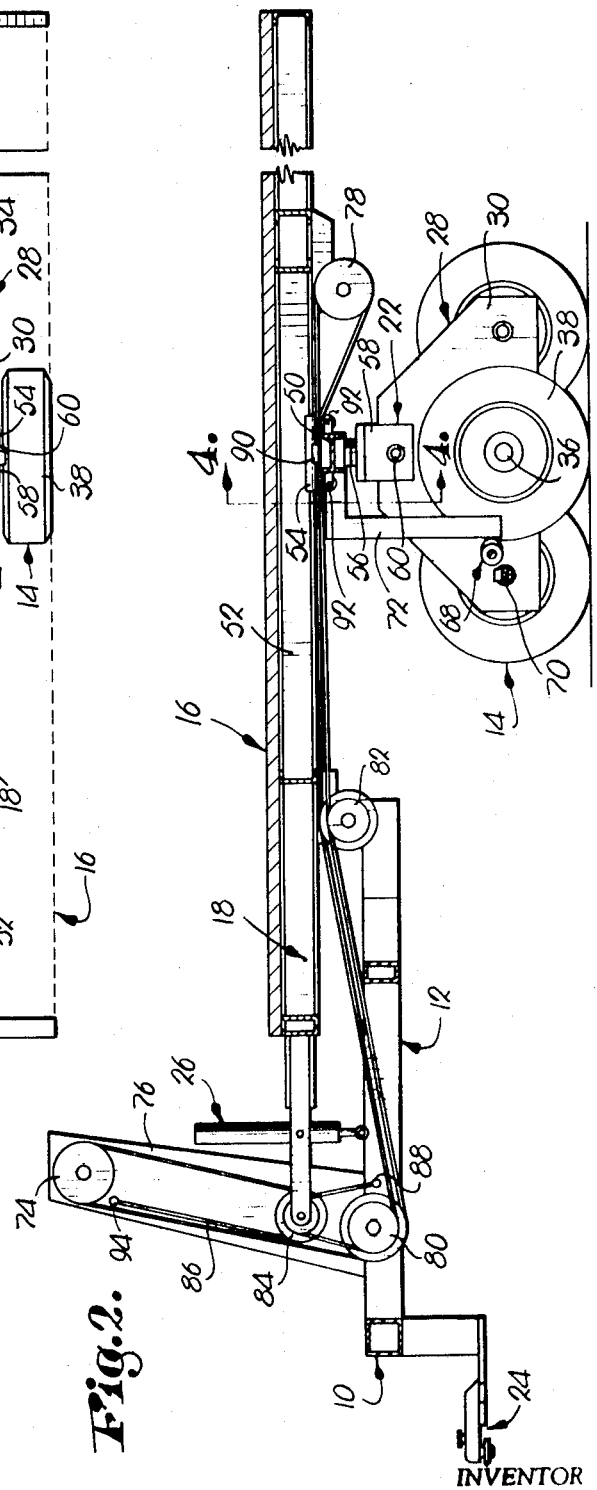

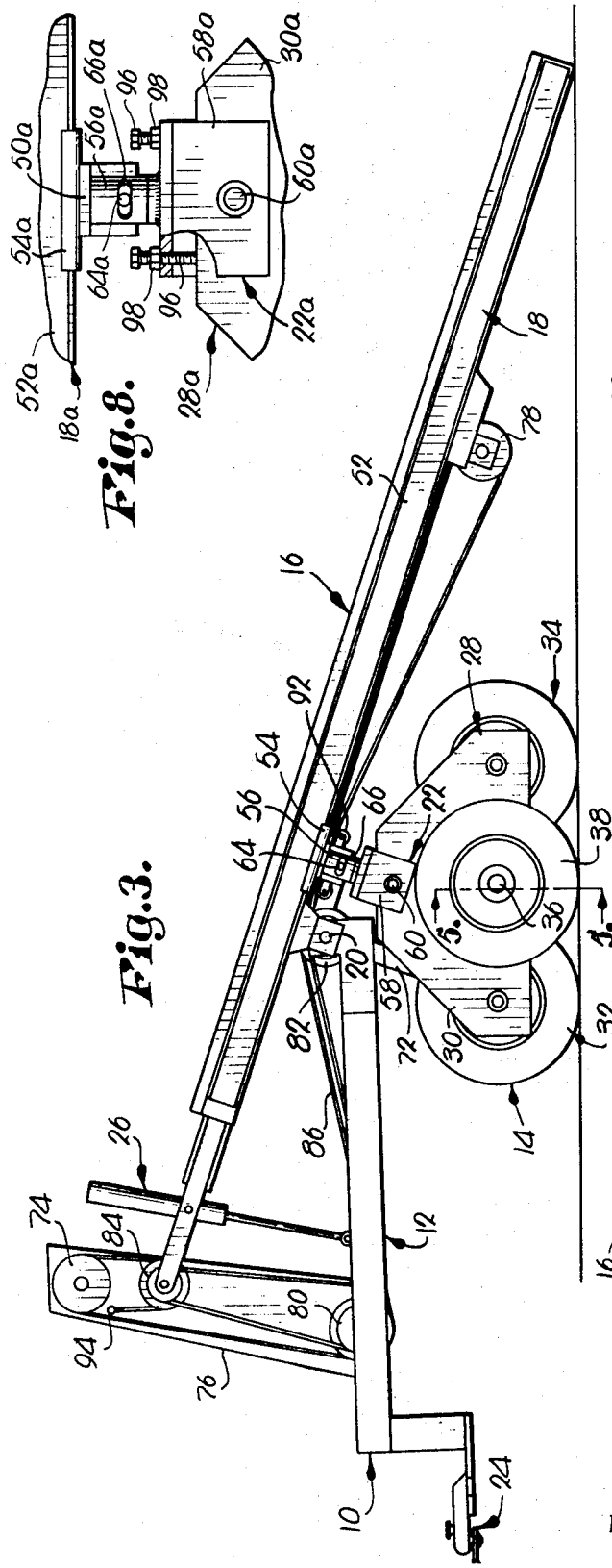

WHEEL SUSPENSION

An important object of our present invention is to provide a tilt bed vehicle having an undercarriage that shifts along the underside of the vehicle in response to tilting of the bed.

Another important object of the instant invention is the provision of a vehicle having a pivotal connection between the bed and its supporting trucks to enable the vehicle to more easily traverse uneven terrain.

Yet another important object of our invention is to provide a vehicle having a pair of trucks that are pivotal about a vertical axis, enabling the vehicle to be steered.

A further important object of the present invention is to provide a vehicle having a pair of wheeled trucks each having a front, a rear, and an intermediate wheel and axle assembly, the axle of the intermediate assembly pivoting with respect to the truck about an axis extending fore and aft of the vehicle to enable the truck to traverse objects that may lie in the vehicle's path.

In the drawings:

FIG. 1 is a top plan view of a wheel suspension made pursuant to our present invention with the bed floor removed;

FIG. 2 is a vertical, cross-sectional view taken along line 2—2 of Fig. 1;

FIG. 3 is a side elevational view showing the bed tilted;

FIG. 4 is an enlarged, fragmentary cross-sectional view taken along line 4—4 of Fig. 2;

FIG. 5 is an enlarged, fragmentary, cross-sectional view taken along line 5—5 of Fig. 3;

FIG. 6 is a fragmentary, side elevational view, partly in section, taken along line 6—6 of Fig. 5;

FIG. 7 is a fragmentary, cross-sectional view taken along line 7—7 of Fig. 6; and FIG. 8 is a fragmentary, detailed view illustrating a modified coupling.

Vehicle 10 has a chassis 12, an undercarriage 14 and a bed 16. Framework 18 of bed 16 is connected with chassis 12 by pivot pins 20 and with undercarriage 14 through a coupling 22. Vehicle 10 may be placed in tow through use of a hitch 24 on chassis 12, and bed 16 may be titled about pins 20 through use of a fluid piston and cylinder assembly 26 pivotally interconnecting chassis 12 and framework 18.

Undercarriage 14 has two identical trucks 28, each provided with two upright plates 30. A pair of wheel and axle assemblies 32 and 34 are provided for each pair of plates 30 and an intermediate axle 36 has a pair of wheels 38. Axles 36 pass through clearance holes 40 in plates 30 and through cages 42 between the plates 30.

Cages 42 may be raised or lowered by virtue of the provision of a plurality of tapped openings 44 in plates 30 for fastening bolts 46. Fore and aft cross pins 48 attach axles 36 to cages 42 for swinging movement of axles 36 in the manner shown by Fig. 5.

The coupling 22 includes a crosshead 50 which connects with beams 52 of framework 18 by clips 54 that are slidable fore and aft of beams 52, and with undercarriage 14 by tubes 56 rigid to crosshead 50. Yokes 58 embrace the plates 30 and are swingably attached thereto by cross pins 60. Tubes 56 rotatably receive upstanding pintles 62 rigid to yokes 58, the extent of rotation being limited by cross pins 64 which traverse pintles 62 and extend through slots 66 in tubes 56.

Steering of undercarriage 14 is effected by fluid piston assembly 68 to turn the trucks 28 about the vertical axes of tubes 56. The axles of the assemblies 32 are pivotally interconnected by a rod 70, and the crosshead 50 has a bracket 72 rigid thereto. The assembly 69 pivotally interconnects rod 70 and bracket 72.

Reciprocation of the undercarriage 14 takes place automatically upon tilting of bed 16 by a pulley-cable assembly which includes a pulley 74 on a standard 76 rigid to chassis 12 and a pulley 78 on bed 16 rearwardly of crosshead 50, together with double pulleys 80 and 82 on chassis 12 and a double pulley 84 on bed 16.

Cable 86 extends from a point of attachment 88 to chassis 12, upwardly over pulley 84, thence downwardly under pulley 80, then rearwardly over pulley 82, then above the crosshead 50 (to which it is attached at 90), then under and around pulley 78, thence forwardly over rollers 92 carried by crosshead 50, then over pulley 82, under pulley 80, and over pulley 74, under pulley 84 to a point of attachment 94 to standard 76.

In normal travel of the vehicle 10, the assembly 26 holds the bed 16 horizontal (Figs. 1 and 2) and as the trucks 28 encounter uneven terrain they are free to swing individually about the horizontal axes of cross pins 60. Moreover, they may be turned together as a unit upon actuation of assembly 68 to steer the trucks 28 about the vertical axes of tubes 56.

In the modification of Fig. 8, wherein like reference numerals are used with the addition of the letter "a", tilting of trucks 28a may be limited or prevented by use of stop bolts 96 in the bights of yokes 58a which may bear against one of the plates 30a and be held in place by lock nuts 98.

Each of the axles 36 may also tilt as the result of uneven terrain as shown in Fig. 5.

When assembly 26 is actuated to tilt bed 16 about the axes of pins 20, upward movement of pulley 84 away from pulley 80 and toward pulley 74 causes cable 86 to pull undercarriage 14 toward chassis 12 and, at the same time, the coupling 22 tilts about the axes of cross pins 60 as shown in Fig. 3. Conversely, cable 86 pulls the undercarriage 14 rearwardly as bed 16 is lowered to the position shown in Figs. 1 and 2.

Having thus described the invention, what is claimed as new and desired to be secured by Letters Patent is:

1. In a vehicle:
   an elongated bed;
   a chassis and an undercarriage underlying the bed in supporting relationship thereto;
   pivot means interconnecting the chassis and the bed for swinging movement of the latter about a first generally horizontal axis,
   said undercarriage having a coupling mounted thereon for swinging movement about a second generally horizontal axis;
   structure pivotally connecting the bed with said coupling for reciprocable movement of the latter toward and away from the chassis;
   power means interconnecting the chassis and the bed for swinging the latter about said first axis; and
   mechanism interconnecting the chassis, the bed and said coupling for reciprocating the latter and swinging the same about said second axis in response to swinging of the bed.

2. The invention of claim 1,
   said mechanism including a pulley-cable assembly having a first pulley secured to the chassis and a second pulley secured to the bed for movement with the latter toward and away from the first pulley during swinging of the bed,
   the cable of said assembly being secured to said coupling whereby movement of the second pulley toward the first pulley shifts the undercarriage in one direction and movement of the second pulley away from the first pulley shifts the undercarriage in the opposite direction.

3. The invention of claim 1,
   said chassis having a hitch at the normally forwardmost end thereof adapted for coupling with a towing unit,
   said pivot means being at the opposite end of the chassis, intermediate the ends of the bed interposed between the bed and chassis.

4. The invention of claim 1,
   said coupling including a crosshead interposed between the bed and the undercarriage,
   said bed being provided with track means therebeneath slidably receiving said crosshead for movement longitudinally of the bed.

* * * * *

PO-1050
(5/69)

UNITED STATES PATENT OFFICE
CERTIFICATE OF CORRECTION

Patent No. 3,624,786                     Dated November 30, 1917

Inventor(s) Ezra Cordell Lundahl

It is certified that error appears in the above-identified patent and that said Letters Patent are hereby corrected as shown below:

On the first page the date patented should have the year date "1917" deleted and the year date - - 1971 - - substituted in its place.

Signed and sealed this 24th day of April 1973.

(SEAL)
Attest:

EDWARD M. FLETCHER, JR.　　　　　ROBERT GOTTSCHALK
Attesting Officer　　　　　　　　Commissioner of Patents